United States Patent
Schlamann

(10) Patent No.: US 11,937,547 B2
(45) Date of Patent: Mar. 26, 2024

(54) ATTACHMENT FOR HARVESTING STALK-LIKE STEM CROPS WITH MESHING PICKING ROTORS

(71) Applicant: Carl Geringhoff GmbH & Co. KG, Ahlen (DE)

(72) Inventor: Frank Schlamann, Gronau (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 450 days.

(21) Appl. No.: 17/265,526

(22) PCT Filed: Jul. 1, 2019

(86) PCT No.: PCT/EP2019/067610
§ 371 (c)(1),
(2) Date: Feb. 3, 2021

(87) PCT Pub. No.: WO2020/025236
PCT Pub. Date: Feb. 6, 2020

(65) Prior Publication Data
US 2021/0289705 A1 Sep. 23, 2021

(30) Foreign Application Priority Data

Aug. 3, 2018 (DE) .................. 10 2018 118 958.3

(51) Int. Cl.
*A01D 45/02* (2006.01)
*A01D 46/00* (2006.01)

(52) U.S. Cl.
CPC ........... *A01D 46/00* (2013.01); *A01D 45/025* (2013.01)

(58) Field of Classification Search
CPC .... A01D 45/025; A01D 45/021; A01D 45/02; A01D 82/00; A01D 82/02; A01D 34/8355; A01D 43/082; A01D 45/023; A01F 11/06
See application file for complete search history.

(56) References Cited

U.S. PATENT DOCUMENTS

| 2,538,965 | A | * | 1/1951 | Fergason | ............. | A01D 45/025 460/27 |
| 3,100,491 | A | | 8/1963 | Dillon | | |

(Continued)

FOREIGN PATENT DOCUMENTS

| DE | 1 972 327 | 11/1967 |
| DE | 91 05 932 | 8/1991 |

(Continued)

*Primary Examiner* — Adam J Behrens
*Assistant Examiner* — Madeline I Runco
(74) *Attorney, Agent, or Firm* — Gudrun E. Huckett

(57) ABSTRACT

The invention relates to an attachment for attaching to a harvesting machine, comprising a number of picking devices (2) distributed adjacent to one another over the working width, said picking devices having at least a first and a second picking rotor (10a, 10b), which can be driven in counterrotation. The drawing edges (14) on the drawing bodies (12) on the first and second picking rotors (10a, 10b) are arranged in relation to one another in such a way that, during rotary movement of the first and second picking rotors (10a, 10b), two adjacent drawing edges (14) of the first picking rotor (10a) hold, in the range of action of said drawing edges into the downward movement path of a plant stalk (8), the plant stalk (8) temporarily against the drawing edges (14) of the second picking rotor (10b) preceding and lagging behind the two adjacent drawing edges (14) of the first picking rotor (10a) and clamp the plant stalk (8), by means of the four contact points (26) of the plant stalk (8), against the drawing edges (14) of the first and second (Continued)

picking rotors (10a, 10b) into an arc shape approximating the enveloping circle (16) of the first picking rotor (10a), and on the second picking rotor (10b) a knife blade (20) is arranged between the preceding and lagging drawing edges (14) of the second picking rotor (10a), which knife blade cuts into the outside of the plant stalk (8) clamped in an arc shape.

13 Claims, 4 Drawing Sheets

(56) References Cited

U.S. PATENT DOCUMENTS

| | | | |
|---|---|---|---|
| 3,304,702 A * | 2/1967 | Russell | A01D 45/025 56/104 |
| 3,858,384 A * | 1/1975 | Maiste | A01D 45/025 56/104 |
| 3,982,385 A * | 9/1976 | Hyman | A01D 45/025 56/106 |
| 4,233,804 A | 11/1980 | Fischer et al. | |
| 5,161,356 A | 11/1992 | Pick | |
| 5,269,126 A | 12/1993 | Kalverkamp | |
| 5,787,696 A | 8/1998 | Wiegert et al. | |
| 6,216,428 B1 * | 4/2001 | Becker | A01D 45/025 56/104 |
| 2001/0003237 A1 | 6/2001 | Wolters et al. | |
| 2011/0308220 A1 | 12/2011 | Priepke et al. | |
| 2014/0059994 A1 | 3/2014 | Surmann et al. | |

FOREIGN PATENT DOCUMENTS

| | | | |
|---|---|---|---|
| DE | 43 44 669 | 4/1995 | |
| EP | 0 474 072 | 3/1992 | |
| EP | 0 486 887 | 6/1992 | |
| EP | 0943229 A1 * | 9/1999 | |
| EP | 1 106 048 | 6/2001 | |
| FR | 2 453 595 | 11/1980 | |
| FR | 2784263 A1 * | 4/2000 | A01D 45/025 |
| RU | 2309575 | 11/2007 | |
| RU | 2314671 | 1/2008 | |
| SU | 254928 | 10/1969 | |

* cited by examiner

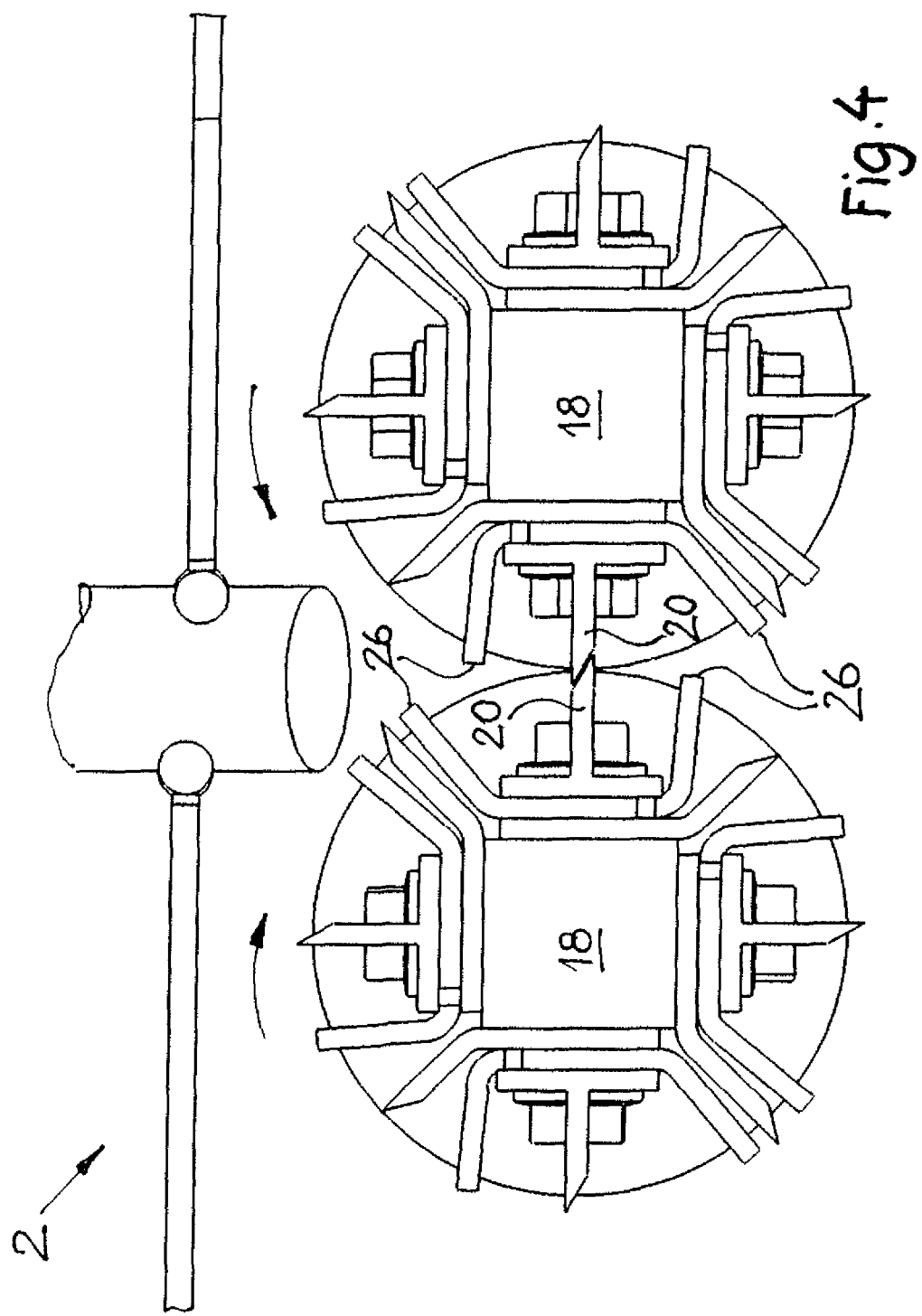

ATTACHMENT FOR HARVESTING STALK-LIKE STEM CROPS WITH MESHING PICKING ROTORS

BACKGROUND OF THE INVENTION

The present invention relates to an attachment for attachment to a harvesting machine having a number of picking devices arranged adjacent to one another distributed over the working width, the picking devices each have a picking gap laterally delimited by picking plates, under which at least a first and a second picking rotor drivable to rotate in opposite directions are arranged, the picking rotors are each provided with multiple radially protruding intake edges formed on intake bodies, the enveloping circles of which mesh with one another, and adjacent intake edges of the first picking rotor delimit intermediate spaces between them within the enveloping circle, which extend along the longitudinal direction of the first picking rotor and into which the intake edges of the opposing second picking rotor plunge during a revolution of the first and second picking rotors.

A generic attachment is known from document DE 1 972 327, for example. The picking rotors disclosed there are composed of four right-angled profiles having L-shaped cross section in such a way that the profiles delimit a square interior with their longer legs and the shorter legs together with an adjoining protrusion of the longer legs each form a double-layer vane, which protrudes from the rotor core and are each used as an intake body in order to tear down a plant stalk. Such an intake strip forms an intake body which is used to grasp a plant stalk, to pull it down and, in the process, to squeeze and/or cut it.

The outward-facing end faces of the vanes are beveled and thus form blade-like cutting edges, using which the plant stalks grasped by them are cut. In this embodiment, however, the vanes are not supposed to cut through the plant stalks, but but are only supposed to exert a great picking force on the plants. It is described that the picking rotors are arranged in pairs with respect to one another in such a way that the intake edges of the vanes mesh with one another during the rotation of the picking rotors so that they pass one another at a close distance without, however, touching one another.

In document DE 91 05 932, picking rotors are described whose picking rotors are arranged offset from one another in their rotational position and whose intake strips as intake bodies are curved so that, in approximately the first half of the rotational angle associated with the engagement area, the outer edge of the cutting strip on the leading intake roller passes by at approximately equal distance on the curved surface of the intake strip of the intake strip of the corresponding intake strip of the trailing intake roller, from the outside to the inside. The intake bodies of the cooperating picking rotors are curved in different directions: while all intake bodies of one picking rotor are curved leading in the direction of rotation, all intake bodies of the opposite picking rotor have a curvature in a trailing direction. With this arrangement, two positions result during a full revolution of the picking rotors, in which the cooperating intake bodies cut a plant stalk, directly when entering the active area of the picking rotors and when leaving the active area.

The cut in the entry zone is problematic because after the cut, traction forces can no longer be transmitted from the cut-off section of the plant stalk downward onto the part of the plant stalk which is not yet cut. The plant stalk is therefore not accelerated downward very effectively. This has direct detrimental effects on the picking quality when picking the fruit clusters. If the plant stalks do not have a sufficient movement speed downward, it can happen that cobs are not picked or are crushed during picking, from which crop losses directly result. There is also the problem that the picking gap can be too short if the removal speed of the plant stalk is too low, if the plants to be harvested have grown large. As a result, the plant is no longer pulled in with its full length and chopped up, but the ends remain unprocessed. An effective acceleration and removal of the plant stalks downward is therefore important.

The picking rotor having the leading curved intake bodies does grasp the plant stalk well and accelerate it downwards, but due to the trailing shape of the intake bodies on the opposite picking rotor, this picking rotor transfers practically no acceleration forces to the plant stalk, its intake bodies only form a support for the plant stalks during the intake and the cutting.

In the known arrangements of the intake edges and cutter blades with respect to one another, the plant stalks are usually cut on the side of the plant stalk that has been compressed by the intake edges. As a result, it happens again and again that plant stalks are not cut cleanly. Either the plant stalks are cut from two sides at the same time, then it is difficult to transfer a traction force to the plant stalk, using which the stalk is pulled down and the fruit clusters are separated from the plant stalk at the picking plates, or the plant stalks are alternately cut from one side in each case, whereby the cut then results on the already compressed points. The irregular cut results in an unclean harvest picture on the harvested field. The stalk pieces that are too long decompose worse than stalk pieces cut shorter and thus hinder the sowing and growth of the following crop. Unclean cuts are also strenuous, which increases the drive power required to operate the attachment. The higher drive power makes the attachment more expensive and heavier, in particular if it has a larger number of picking devices.

It is the object of the present invention to improve the cuts executed by a picking device in that the cuts are made more reliably and with less force required.

SUMMARY OF THE INVENTION

The object is achieved for a generic attachment in that the intake edges on the intake bodies on the first and second picking rotors are arranged in relation to one another in such a way that, during a revolution movement of the first and second picking rotors, two adjacent intake edges of the first picking rotor, in their effective area in the downwardly directed trajectory of a plant stalk, hold the plant stalk temporarily pressed against the leading and trailing intake edges of the second picking rotor in relation to the two adjacent intake edges of the first picking rotor and clamps the plant stalk by way of the four contact points of the plant stalk on the intake edges of the first and second picking rotor in an arc shape approximating the enveloping circle of the first picking rotor, and a cutter blade is arranged on the second picking rotor between the leading and trailing intake edges of the second picking rotor, which cuts into the outside of the plant stalk clamped in the arc shape.

When reference is made hereinafter to a first and a second picking rotor, this differentiation is used only to distinguish between the two picking rotors in a specific rotational position with respect to one another. If cutter blades are arranged on both picking rotors, the assignment between the first and the second picking rotors alternately changes back and forth in the course of one revolution depending on the rotational position of the two picking rotors with respect to one another. The first picking rotor can therefore mean both the right and and also the left picking rotor of a pair of picking rotors, depending on the rotational position of the two picking rotors, and the same applies to the second picking rotor.

Due to the special arrangement of the intake edges and the cutter blade with respect to one another, the plant stalk is held in the cutting position during the cut so that the cutter blade cuts into the plant stalk from the side that is kept pre-tensioned. Due to the pre-tensioning, the plant stalk can no longer yield as far to the side to the cutter blade as it could without pre-tensioning. The pre-tensioning of the plant stalk also has the effect that the cells of the support structure of the plant stalk, which are elastic within limits, are already pre-tensioned in the traction direction. The pre-tensioning reduces the elasticity of the cells transverse to the cutting direction, so that the cutter blade can more easily penetrate into the cell mass and sever it. During the severing movement, a kind of zipper effect results: the cells that are being cut by the cutter blade are always pre-tensioned the most, because these cells are subject to the greatest tensile load after the cells located further outside have been cut through. During this cut, uncut cell packets are thus not firstly only pressed against one another by the cutter blade and then have to be hacked through thereafter with increased force, but a smooth cut is enabled in which the cells engaged by the cutter blade are severed continuously over the cutting movement.

The forces required to cut a plant stalk can thus be kept lower. This makes the design and operation of the attachment easier and more cost-effective. The cutting picture of the harvested field is more uniform. In addition, sowing and growth of the following crop is facilitated.

The pre-tensioning of the plant stalk is increased in the cutting area in particular if the plant stalk is held in the cutting position by at least two intake edges of the first picking rotor. Due to the two intake edges, the plant stalk fits itself more closely to the arc of the enveloping circle of the picking rotor or the intake edges. If there is only one single intake edge, a kink in the plant stalk easily results, upon which the plant stalk is compressed in the support area and can then also be cut less well in a smooth cut in the adjacent area around the support point. Due to the two intake edges on the first picking rotor, which are arranged adjacent but spaced apart from one another, it is possible to cut between the contact points of the plant stalk with these intake edges into which the plant stalk has not yet been pressed.

Using the two intake edges that are adjacent, but preferably also spaced apart from one another, it is also easier to keep the plant stalk in a fluid downward motion despite the cut taking place in between. Due to the arc-shaped contact of the plant stalk on the enveloping circle of the intake edges and the sequence of contact points of the plant stalk with the adjacent intake edges of the first picking rotor with the trailing intake edge of the second picking rotor and the transverse offset between these contact points, at least part of the traction force, using which the plant stalk is drawn downward, is maintained even after the plant stalk has been cut by the cutter blade. A plant stalk can also be kept squeezed between the trailing intake edge of the first picking rotor and the trailing intake edge of the second picking rotor, depending on the size of the remaining gap and the diameter of the plant stalk, whereby the conveyance aggressiveness of the picking device increases.

According to one embodiment of the invention, the enveloping circles of the two adjacent intake edges of the first picking rotor protrude over the front edge of the picking plate arranged above it into the downwardly oriented trajectory of a plant stalk pulled down between the picking plates. Since the front edge of the picking plate laterally supports the plant stalk in its downward trajectory, the protrusion of the enveloping circles of the intake edges already results in a forced contact of the plant stalk on the enveloping circles of the intake edges extending in a circular arc when the plant stalk is conveyed downward under tension.

According to one embodiment of the invention, the enveloping circles of the intake edges of the second picking rotor leading and trailing with respect to the two adjacent intake edges of the first picking rotor also protrude over the front edge of the picking plate arranged above into the downwardly oriented trajectory of a plant stalk pulled down between the picking plates. In particular in combination with the intake edges of the first picking rotor protruding in the opposite direction, at least a double deflection of a plant stalk results, seen in the conveying direction, before it is cut, which results in good pre-tensioning in the cutting area.

According to one embodiment of the invention, the cutting movement of the cutter blade during the revolution of the first and second picking rotor is oriented into the intermediate space between the two adjacent intake edges of the first picking rotor. With this constellation, the plant stalk is held on both sides of the cutter blade by the adjacent intake edges and supported against the cutting movement. As a result, the tension of the plant stalk in the cutting area can be kept high, and the plant stalk is held in front of the cutter blade in an alignment that is approximately or even exactly transverse to the cutting plane of the cutter blade. This promotes cutting accuracy and cutting efficiency.

According to one embodiment of the invention, a cutter blade is arranged on the first picking rotor between the adjacent intake edges and interacts with the cutter blade on the second picking rotor. In this arrangement, one cutter blade respectively forms the counter blade to the other cutter blade, which move towards one another during a cut and away from one another again after the dead center. This combination results in a very safe and clean cut of the plant stalk.

According to one embodiment of the invention, the cutter blades are ground on one side. Due to the grind, the cutter blades can move over one another during each revolution and clean one another in the process. The cutting safety is thus increased again. The cutter blades thus remain sharp and clean.

According to one embodiment of the invention, the intake bodies are designed as angle profiles fastened on a rotor shaft of the picking rotor. The angle profiles are robust, can absorb high forces, and are easily installable. The intake bodies can be designed as an L or U profile. For example, four, eight, or even more or fewer intake bodies can be arranged on a rotor shaft. A leg of an intake body pointing exactly or approximately in the radial direction with respect to the rotor shaft can be aligned at a right angle or at an angle deviating therefrom to the leg of the intake body screwed onto the rotor shaft.

According to one embodiment of the invention, the cutter blades are formed at the outer end of a leg of an angle profile which is fastened to a rotor shaft of a picking rotor. This construction makes the cutter very stable overall and able to absorb high forces without being damaged or deformed. It is easily installable, for example using screws, so that if it is worn it can be easily removed and ground or completely replaced.

According to one embodiment of the invention, the angle profiles of the intake bodies and the angle profiles of the cutter blades are each held on the rotor shaft by common screws. This simplifies installation. The angle profiles of the cutter blades and the intake edges can mutually support and reinforce one another.

According to one embodiment of the invention, two legs of adjacent angle profiles jointly form a cutter blade. The legs can be installed placed back to back against each other. The legs thus mutually support one another under load and can absorb greater forces. If each angle profile is connected using the rotor-side leg at a different position on the rotor shaft, the angle profiles of the intake edges can be installed having a uniform structural height without having to provide different components for this purpose. The angle profiles of the cutter blades, which are placed back to back against each other, can also be installed as an equivalent part.

According to one embodiment of the invention, the enveloping circles of the intake edges have a larger diameter than the enveloping circles of the cutter blades. With their larger enveloping circle, the intake edges thus press a plant stalk in the cutting position in one direction toward the cutter blade, wherein the cutter blade advantageously plunges with its cutting edge at least into the enveloping circle formed by the associated intake edges in order to be able to cut through a plant stalk as safely as possible. The radius of the enveloping circle of the cutter blades of a picking rotor advantageously corresponds at least approximately, but at most to half the distance value of the distance of the rotor shafts from one another, while the radius of the enveloping circle of the intake edges of a picking rotor is greater than half the distance value of the distance of the rotor shafts from one another. With these size ratios of the enveloping circles in relation to one another, reliable, good cutting behavior results while the picking rotors still have good conveying properties.

According to one embodiment of the invention, intermediate spaces between adjacent intake edges of the first and second picking rotors occupy differently sized circular arc components, wherein the cutter blades on the first and second picking rotor are each arranged in a position in which they are each opposite to a smaller intermediate space of the opposite picking rotor in their cutting position. This alternating relationship of the intermediate spaces to one another means that a plant stalk is supported in an arc shape on at least the side of its trajectory opposite to the cutter blade by two closely spaced, adjacent intake edges of the first picking rotor, while the adjacent intake edges of the second picking rotor, which form a larger intermediate space and lead and trail the cutter blade, permit the plant stalk to yield in an arc shape into this larger intermediate space, in which the side of the plant stalk held pre-tensioned is then held facing toward the cutter blade.

Further features of the invention emerge from the claims, the figures, and the description of the subject matter. The features and feature combinations mentioned above in the description as well as the features and feature combinations mentioned below in the description of the figures and/or merely shown in the figures may be used not only in the combination specified, but also in other combinations or alone, if not opposed by technically required obstacles.

BRIEF DESCRIPTION OF THE DRAWINGS

The invention will now be explained in more detail on the basis of a preferred exemplary embodiment and with reference to the accompanying drawings.

In the figures:

FIG. 4: shows a view of the pair of picking rotors shown in FIG. 3 in a second rotational position.

DESCRIPTION OF PREFERRED EMBODIMENTS

Figure 1:
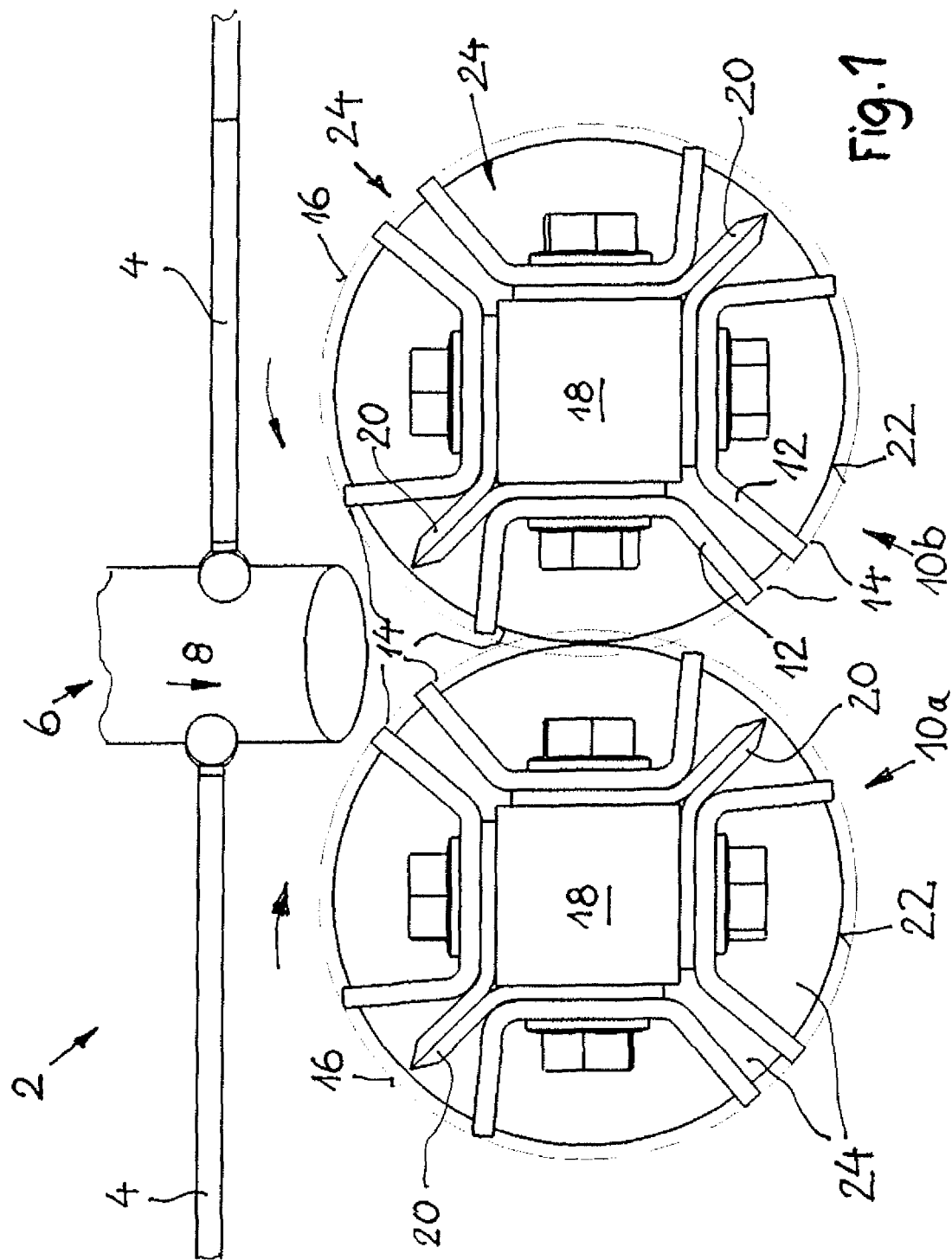
FIG. 1: shows a view of a pair of picking rotors of a picking device in a first rotational position.

FIG. 1 shows a schematic view of a pair of picking rotors $10a$, $10b$ in a picking device 2. Above the two picking rotors $10a$, $10b$, two picking plates 4 are located, which delimit a picking gap 6 between them. When harvesting stalk-like stem crops, the plant stalks 8 are pulled down using the picking rotors $10a$, $10b$. Fruit clusters that are located on the plant stalk 8 are torn off of the plant stalk 8 by the lateral edges of the picking gap 6. The fruit clusters are then separately removed in the attachment and processed further, while the plant stalks are chopped up by the picking rotors $10a$, $10b$ and discarded onto the field.

Intake bodies 12 are arranged on the circumferential surface of the picking rotors $10a$, $10b$. The intake bodies 12 are designed in such a way that intake edges 14 are located on them in the outer circumferential area, which laterally grasp, accelerate, pull down, and then discard a plant stalk 8 in the course of the rotational movement of the picking rotors $10a$, $10b$ in opposite directions, During the rotational movement of the picking rotors $10a$, $10b$, the intake bodies 12 each describe with their intake edges 14 an enveloping circle 16, in which the intake bodies 12 having the intake edges 14 revolve. The rotor shafts 18 of the picking rotors $10a$, $10b$ are positioned so close to one another that the enveloping circles 16 of the two picking rotors $10a$, $10b$ overlap in an angular range.

In order not only to convey the plant stalks 8 downwards, but also to cut them in the process, additional cutter blades 20 are also located on the picking rotors $10a$, $10b$. The cutter blades 20 revolve in the enveloping circle 22. In the exemplary embodiment, the enveloping circles 22 of the cutter blades of the two picking rotors $10a$, $10b$ touch at one point, but they do not overlap. The size of the enveloping circles and the distance of the respective enveloping circles from one another can be designed differently from the exemplary embodiment in an attachment.

In the picking rotors $10a$, $10b$, there is an intermediate space 24 in each case between adjacent intake edges 14 on the intake bodies 12. Different distances of the successive intake edges 14 from one another result in different intermediate spaces 24 between the adjacent intake edges 14, depending on which adjacent intake edges 14 are considered. On the two picking rotors $10a$, $10b$ in FIG. 1, on the one hand, two adjacent intake edges are comparatively close to one another, and if one jumps one intake edge 14 further in the consideration of the intermediate spaces 24 in a pair of the intake edges 14, a larger intermediate space 24 is located. Larger and smaller intermediate spaces 24 are thus formed in a continuous sequence on the picking rotors $10a$, $10b$.

Figure 2:
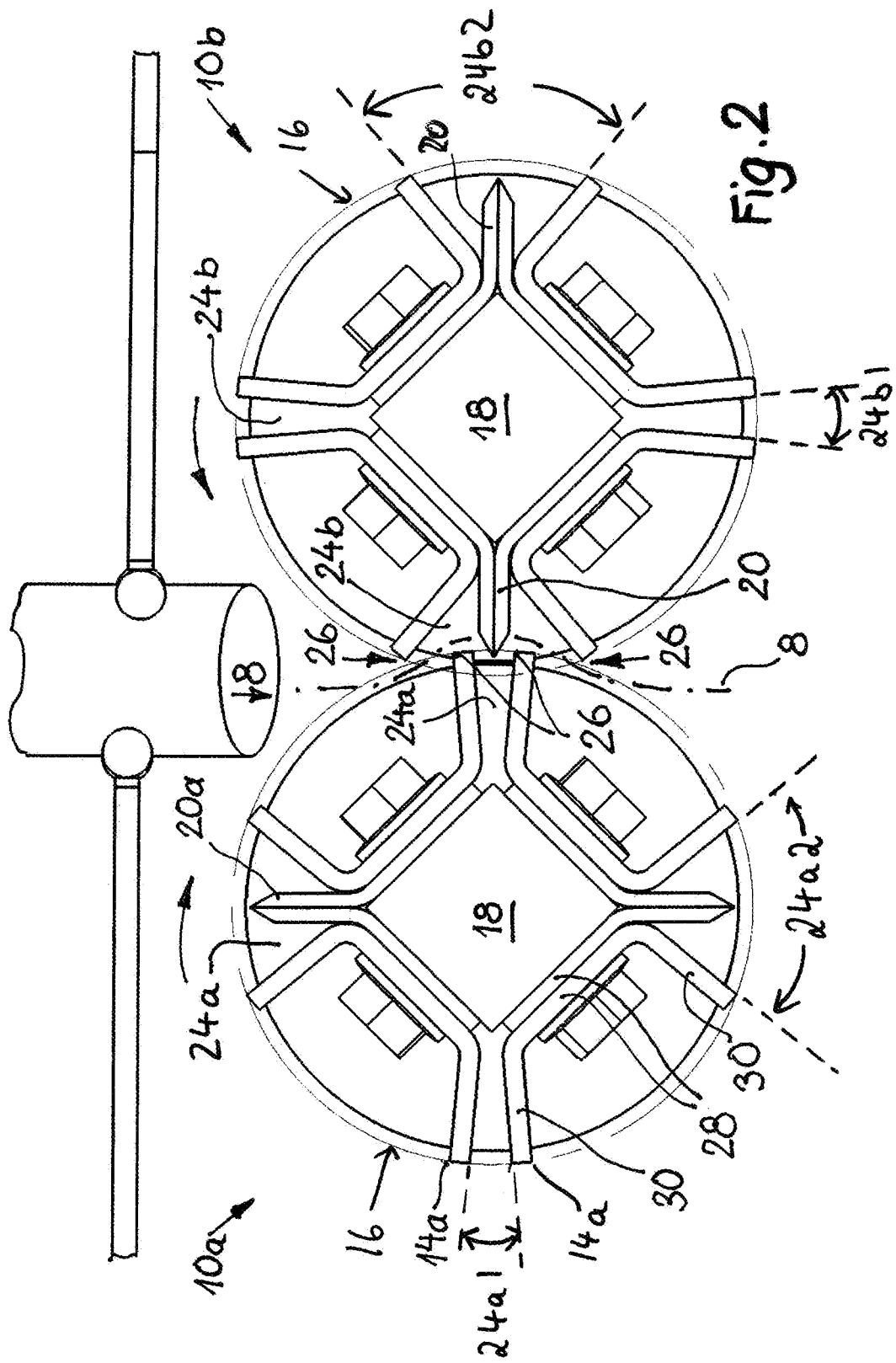
FIG. 2: shows a view of the pair of picking rotors shown in FIG. 1 in a second rotational position.

As shown in FIG. 2, intermediate spaces $24a$, $24b$ between adjacent intake edges 14 of the first and second picking rotors $10a$, $10b$ occupy differently sized circular arc components (small circular arc components: $24a1$, $24b1$;

large circular arc components: 24*a*2, 24*b*2) of the enveloping circle 16, wherein the cutter blades 20 on the first and second picking rotors 10*a*, 10*b* are each arranged in a position in which they are each opposite to a smaller intermediate space (small circular arc component 24*a*1, 24*b*1) of the opposite picking rotor in their cutting position.

In FIG. 1, the plant stalk 8 is still located with its base outside the enveloping circles 16 of the intake edges, so that the picking rotors 10*a*, 10*b* have not yet grasped the plant stalk 8.

In FIG. 2, it is indicated how the plant stalk 8 has moved further when the picking rotors 10*a*, 10*b* have rotated further from the rotational position shown in FIG. 1 into the rotational position shown in FIG. 2. In the illustration shown in FIG. 2 it can be seen that the plant stalk 8 in the area of the picking rotors 10*a*, 10*b* rests in the middle area on the intake edges 14*a*, which press the plant stalk 8 in this section into the opposite intermediate space 24*b*, which is in located in the area of the picking rotor 10*b*. Since the plant stalk 8 is held above and below the intake edges 14*a* by the intake edges 14*b*, the result is an arc-shaped course of the plant stalk 8 in which the plant stalk 8 protrudes into the intermediate space 24*b* on the picking rotor 10*b*.

From the view in FIG. 2, it can be seen that the plant stalk 8 in the conveying position shown rests essentially at four contact points 26 on the picking rotors 10*a*, 10*b*, namely on the two intake edges 14*a* of the picking rotor 10*a* and the intake edges 14*b* which are further apart from one another, and which form the intermediate space 24*b* between them and are formed on the picking rotor 10*b*. Because the intermediate space 24*b* is larger than the intermediate space 24*a*, the plant stalk 8 can assume an arc-shaped formation in its passage through the conveying path passing through the two picking rotors 10*a*, 10*b*. In the arc shape, the upper side of the plant stalk 8 facing toward the cutter blade 20 is particularly pre-tensioned by the arc shape toward, while the side of the plant stalk 8 facing the intermediate space 24*a* is rather compressed. If the cutter blade 20 penetrates the plant stalk on the pre-tensioned side of the plant stalk 8 in the course of the rotational movement of the picking rotors 10*a*, 10*b*, the pre-tensioning of the side of the plant stalk 8 facing toward the cutter blade 20 results in a cleaner and comparatively less forceful cut of the plant stalk 8 in this area. The cutter blade 20 is arranged in relation to the opposite intake edges 14 in such a way that, in the rotational position shown, it points exactly into the intermediate space 24*a* in the opposite picking rotor 10*a*. In this rotational position, the plant stalk 8 has already been completely cut through by the cutter blade 20.

During a further rotation from the rotational position shown in FIG. 2, the trailing intake edge 14*b* would pull the plant stalk 8 farther down, while it is still held on the opposite side by the trailing intake edge 14*a*, which leads the trailing intake edge 14*b*. Although the plant stalk 8 has been cut through in the area of the cutter blade 20, the picking rotors 10*a*, 10*b* can thereby pull the plant stalk 8 farther down. In the process, the section of the plant stalk 8 that has already been cut off is discarded down by the two leading intake edges 14*a*, 14*b*.

When the picking rotors 10*a*, 10*b* continue to rotate in the direction of rotation from the rotational position shown in FIG. 2, one of the two cutter blades 20*a* formed on the picking rotor 10*a* approaches the three o'clock position, while the smaller intermediate space 24*b* is then located at the level of the cutter blade 20*a*. In this way, the blade sides and the support sides change continuously back and forth between the two picking rotors 10*a*, 10*b* during the rotational movement of the picking rotors 10*a*, 10*b*.

In the exemplary embodiment, the intake bodies 12 are designed as angle profiles 28, from which legs 30 protrude in the radial direction from the rotor shaft 18. In the exemplary embodiment, angle profiles 28 for the cutter blades 20 and for the intake edges 14 are superimposed and held on the rotor shaft 18 by common screws. This results in a compact and easily installable fastening of the respective components.

Figure 3:
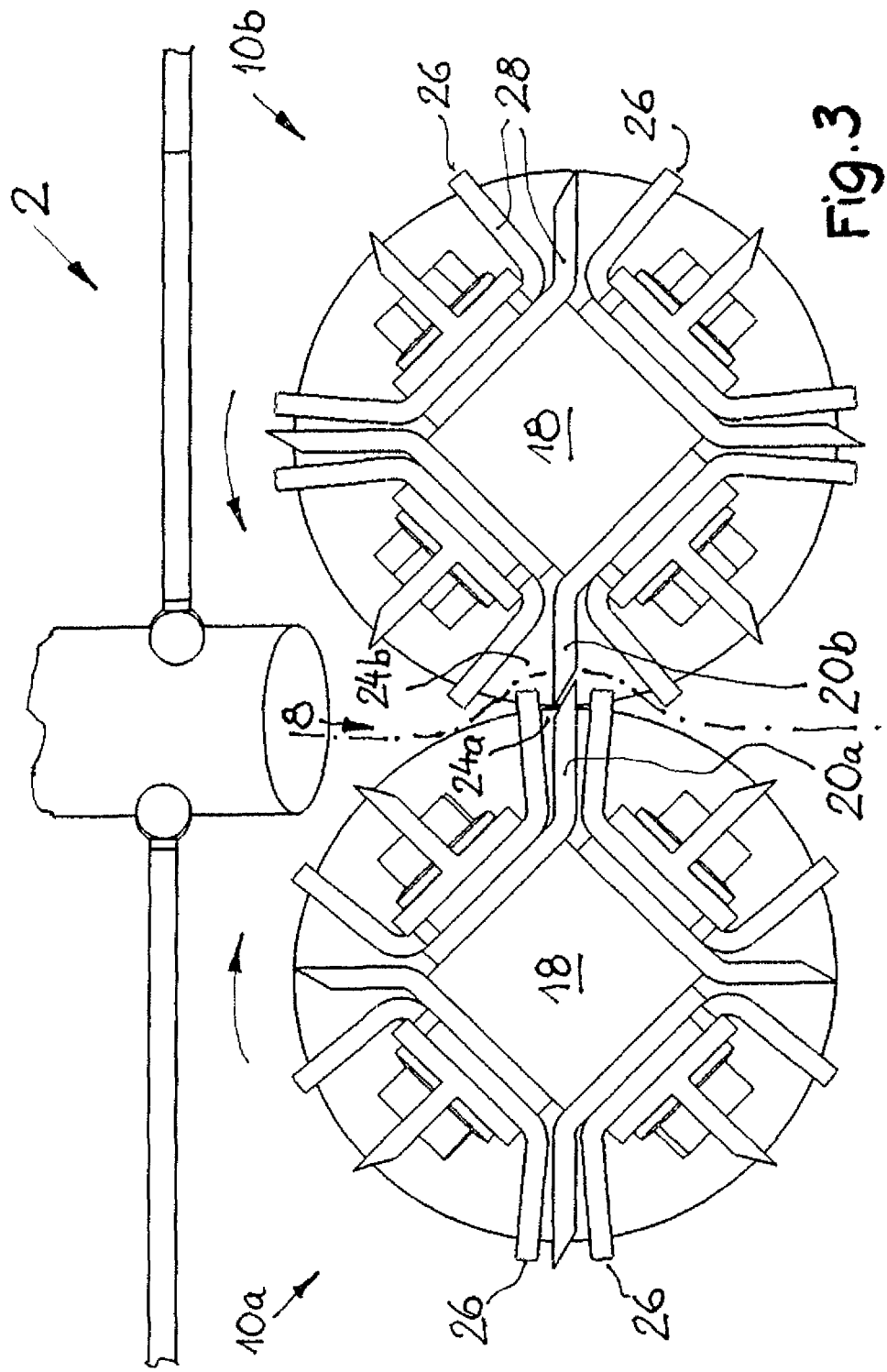
FIG. 3: shows a view of an alternatively designed pair of picking rotors of a picking device in a first rotational position.

FIGS. 3 and 4 show views of an alternatively configured pair of picking rotors 10*a*, 10*b* of a picking device 2. Here a cutter blade 20 is located not only on one side of the two picking rotors 10*a*, 10*b* in a cutting point, but here cooperating cutter blades 20*a*, 20*b* are formed on both sides, using which a plant stalk 8 is cut through in the cutting area.

However, as in the exemplary embodiment shown in FIGS. 1 and 2, the plant stalk 8 is held in an arc-shaped pre-tension via at least four contact points 26, so that at least one of the two cutter blades 20*a*, 20*b* cuts into the plant stalk 8 in a pre-tensioned area.

So that the cutter blades 20*a*, 20*b* can cooperate better with one another, both cutter blades 20*a*, 20*b* are ground on one side. During the rotational movement of the picking rotors 10*a*, 10*b*, the cutting surfaces of the grind of the cutter blades 20*a*, 20*b* slide over one another, so that the two cutter blades 20*a*, 20*b* clean themselves in the process.

The invention is not limited to the above exemplary embodiments. A person skilled in the art will have no difficulty modifying the exemplary embodiments in a way that appears suitable to adapt them to a specific application.

What is claimed is:

1. An attachment for mounting on a harvesting machine, the attachment comprising:
   picking devices arranged adjacent to one another and distributed over a working width of the attachment;
   the picking devices each comprising:
   a first picking plate and a second picking plate delimiting between them a picking gap;
   a first picking rotor arranged underneath the first picking plate and a second picking rotor arranged underneath the second picking plate, wherein the first and second picking rotors are configured to be driven in rotation in opposite rotational directions relative to each other;
   wherein the first picking rotor comprises first intake bodies provided with radially protruding first intake edges, wherein the radially protruding first intake edges comprise a first enveloping circle;
   wherein the second picking rotor comprises second intake bodies provided with radially protruding second intake edges, wherein the radially protruding second intake edges comprise a second enveloping circle, wherein the first and second enveloping circles mesh with one another;
   wherein the radially protruding first intake edges of the first picking rotor delimit between them first intermediate spaces located within the first enveloping circle, wherein the first intermediate spaces extend along a longitudinal direction of the first picking rotor and wherein the radially protruding second intake edges of the second picking rotor plunge into the first intermediate spaces when the first and second picking rotors rotate;
   wherein the radially protruding first intake edges of the first picking rotor and the radially protruding second intake edges of the second picking rotor are arranged in relation to one another so that, when the first and second picking rotors rotate, two adjacently positioned radially protruding first intake edges of the first picking rotor temporarily hold a plant stalk, moving in a downwardly oriented trajectory through the first and second picking rotors, by pressing the plant stalk against the radially protruding second intake edges of the second picking rotor that are trailing and leading in relation to the two adjacently positioned radially protruding first intake edges of the first picking rotor, and temporarily clamp the plant stalk in an arc shape approximating the first enveloping circle of the first picking rotor by four contact points of the plant stalk on the two adjacently positioned radially protruding first intake edges of the first picking rotor and on said radially protruding second intake edges of the second picking rotor that are trailing and leading;

wherein a cutter blade is arranged on the second picking rotor between said radially protruding second intake edges of the second picking rotor that are trailing and leading and cuts into an outside of the plant stalk clamped in the arc shape.

2. The attachment according to claim 1, wherein the first enveloping circle of the first picking rotor protrudes past a front edge of the first picking plate into the downwardly oriented trajectory of the plant stalk being pulled down between the first and second picking plates.

3. The attachment according to claim 2, wherein the second enveloping circle of the second picking rotor protrudes past a front edge of the second picking plate into the downwardly oriented trajectory of the plant stalk pulled down between the first and second picking plates.

4. The attachment according to claim 1, wherein a cutting movement of the cutter blade, when the first and second picking rotors rotate, is oriented into the intermediate space between the two adjacently positioned radially protruding first intake edges of the first picking rotor.

5. The attachment according to claim 1, wherein the picking devices each further comprise a cutter blade arranged on the first picking rotor and interacting with the cutter blade arranged on the second picking rotor.

6. The attachment according to claim 5, wherein the second envelope circle is larger than an envelope circle of the cutter blade arranged on the second picking rotor, and wherein the first envelope circle is larger than an envelope circle of the cutter blade arranged on the first picking rotor.

7. The attachment according to claim 5, wherein the cutter blade arranged on the first picking rotor and the cutter blade arranged on the second picking rotor are ground on one side, respectively.

8. The attachment according to claim 5, wherein the first picking rotor further comprises a first rotor shaft and a first angle profile fastened on the first rotor shaft, wherein the second picking rotor further comprises a second rotor shaft and a second angle profile fastened on the second rotor shaft, wherein the cutter blade arranged on the first picking rotor is formed at an outer end of a leg of the first angle profile, and wherein the cutter blade arranged on the second picking rotor is formed at an outer end of a leg of the second angle profile.

9. The attachment according to claim 8, wherein the first intake bodies are third angle profiles fastened on the first rotor shaft, and wherein the second intake bodies are fourth angle profiles fastened on the second rotor shaft.

10. The attachment according to claim 9, wherein a first common screw connects both the first angle profile and one of the third angle profiles to the first rotor shaft, and wherein a second common screw connects both the second angle profile and one of the fourth angle profiles to the second rotor shaft.

11. The attachment according to claim 1, wherein the second picking rotor further comprises a rotor shaft and an angle profile fastened on the rotor shaft, wherein the cutter blade is formed at an outer end of a leg of the angle profile.

12. The attachment according to claim 1, wherein the second picking rotor further comprises a rotor shaft and two angle profiles fastened on the rotor shaft, wherein the two angle profiles each have a leg with an outer end, wherein the legs are contacting each other and the outer ends together form the cutter blade.

13. The attachment according to claim 1, wherein the picking devices each further comprise a cutter blade arranged on the first picking rotor, wherein the radially protruding second intake edges of the second picking rotor delimit between them second intermediate spaces located within the second enveloping circle, wherein the first intermediate spaces include first spaces occupying a small circular arc component of the first enveloping circle and further include second spaces occupying a large circular component of the first enveloping circle larger than the small circular arc component of the first enveloping circle, wherein the second intermediate spaces include first spaces occupying a small circular arc component of the second enveloping circle and further include second spaces occupying a large circular component of the second enveloping circle larger than the small circular arc component of the second enveloping circle, wherein the cutter blade arranged on the first picking rotor is positioned, in a cutting position thereof, opposite one of the first spaces of the second picking rotor occupying the small circular arc component of the second enveloping circle, and wherein the cutter blade arranged on the second picking rotor is positioned, in a cutting position thereof, opposite one of the first spaces of the first picking rotor occupying the small circular arc component of the first enveloping circle.

* * * * *